March 15, 1966 C. ZELLWEGER ET AL 3,240,034

PYROPHORICALLY IGNITED LIGHTERS

Filed July 23, 1963 8 Sheets-Sheet 1

INVENTORS
CONRAD ZELLWEGER
WILLIAM RETZLER
BY ERIC EDWARD BROOKS

Ward, Neal, Haselton, Orme & McElhannon
ATTORNEYS

PYROPHORICALLY IGNITED LIGHTERS

Filed July 23, 1963

8 Sheets-Sheet 2

INVENTORS
CONRAD ZELLWEGER
WILLIAM RETZLER
BY ERIC EDWARD BROOKS

Ward, Neal, Haselton, Orme & McElhannon
ATTORNEYS

INVENTORS
CONRAD ZELLWEGER
WILLIAM RETZLER
BY ERIC EDWARD BROOKS

Ward, Neal, Haselton, Orme & McElhannon
ATTORNEYS

INVENTORS
CONRAD ZELLWEGER
WILLIAM RETZLER
ERIC EDWARD BROOKS
BY
Ward, Neal, Haselton, Orme & McElhannon
ATTORNEYS

PYROPHORICALLY IGNITED LIGHTERS

Filed July 23, 1963

INVENTORS
CONRAD ZELLWEGER
WILLIAM RETZLER
ERIC EDWARD BROOKS

BY

Ward, Neal, Haselton, Orme & McElhannon
ATTORNEYS

INVENTORS
CONRAD ZELLWEGER
WILLIAM RETZLER
ERIC EDWARD BROOKS
BY

Ward, Neal, Haselton, Orme & McElhannon
ATTORNEYS

March 15, 1966 C. ZELLWEGER ET AL 3,240,034

PYROPHORICALLY IGNITED LIGHTERS

Filed July 23, 1963 8 Sheets-Sheet 7

INVENTORS
CONRAD ZELLWEGER
WILLIAM RETZLER
ERIC EDWARD BROOKS

BY

Ward, Neal, Haselton, Orme & McElhannon
ATTORNEYS

PYROPHORICALLY IGNITED LIGHTERS

Filed July 23, 1963

8 Sheets-Sheet 8

INVENTORS
CONRAD ZELLWEGER
WILLIAM RETZLER
BY ERIC EDWARD BROOKS

Ward, Neal, Haselton, Orme & McElhannon
ATTORNEYS

United States Patent Office 3,240,034

Patented Mar. 15, 1966

3,240,034

PYROPHORICALLY IGNITED LIGHTERS

Conrad Zellweger, Geneva, Switzerland, and William Retzler, Great Bookham, and Eric Edward Brooks, Chessington, England, assignors of one-half to La Nationale S.A., Geneva, Switzerland, a corporation of Switzerland, and one-half to Ronson Corporation, Woodbridge, N.J., a corporation of New Jersey Filed July 23, 1963, Ser. No. 297,129

Claims priority, application Great Britain, July 27, 1962, 2,890/62; Feb. 28, 1963, 8,179/63, 7,833/63; Mar. 1, 1963, 8,255/63; Switzerland, July 27, 1962, 9,014/62

26 Claims. (Cl. 67—7.1)

This invention relates to cigar lighters of the type wherein a vaporized fuel is ignited by the sparking action of a rotating wheel against a pyrophoric element.

Because of the rather intricate operations which take place in the course of igniting, controlling and extinguishing a modern cigar lighter; and because of the temperatures, and other ambient conditions under which these operations must take place, such lighters have become quite complex in design and also have become very expensive to produce.

According to the present invention there is provided a novel lighter construction which permits the use of low cost materials, which is rugged and durable and which requires far less in the way of manufacturing precision and operations than has heretofore been required. This novel construction, moreover, permits reduction of the cost of even gas type lighters to a point where it becomes economically feasible to make them disposable so that they may be thrown away after burning a single factory-installed fuel charge.

According to the prior art the various operative elements of cigar lighters were mounted in their operative positional relationship by means of standards, supports and similar structural elements which were built up on a common wall or casing. The lighter fuel reservoir was also attached to the common casing or wall either by an adhesive or by some clamping means. This type of construction was complex and expensive; and it required a high degree of precision in the component parts.

According to the present invention an inside-out concept of lighter construction is provided whereby a single massive element is hollowed out or recessed to admit the various operative lighter elements and to support and guide these elements in their operational relationship. The present invention is based in part upon an appreciation of the fact that the spaces actually occupied by the lighter elements, such as the flint element for example, are much simpler than the structures required to support and guide them; so that a mere recessing of a massive element to these simple shapes inherently leaves a sound supporting structure. Furthermore, the bulk of the thus formed supporting structure is such that it may be made of many materials heretofore considered unsuitable for supporting lighter elements.

According to a further feature of the present invention there is provided a recessed type of lighter construction wherein the recesses are arranged and located to facilitate fabrication of the lighter and to permit convenient operation thereof. Thus, for example, the recesses may be outwardly exposed and a cover piece attached over them to hold the lighter elements in place. Also, the cover piece may be movable on the lighter to permit access to certain elements for replacement or repair. In certain embodiments the recessing may be interconnected to permit interaction between elements so that, for example, a fingerpiece may be held by the recessed supporting structure and interconnected to effect opening of a burner valve and/or spinning of a sparking wheel.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Certain specific embodiments of the invention have been chosen for purposes of illustration and description, and are shown in the accompanying drawings, forming a part of the specification, wherein.

Figure 1:
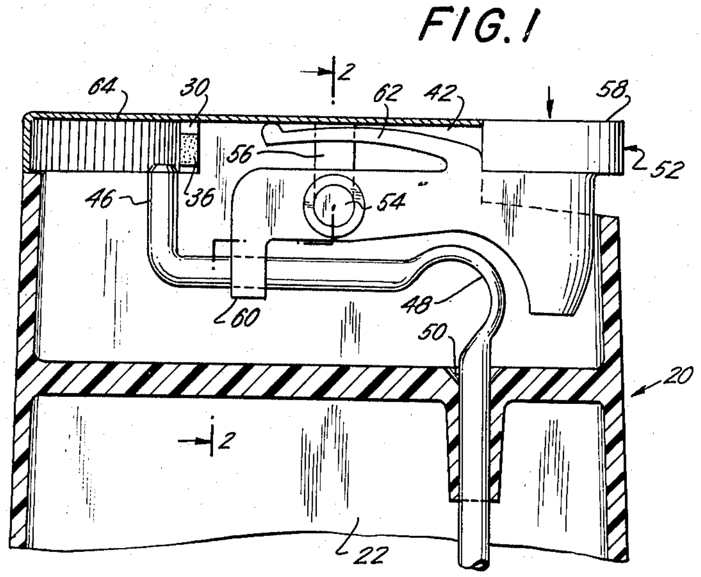
FIG. 1 is a section view of an upper portion of a lighter constituting a first embodiment of the present invention.
Figure 2:
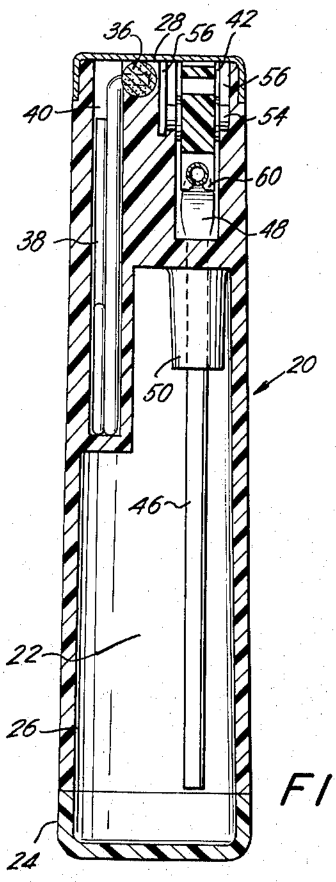
FIG. 2 is a section view of the lighter of FIG. 1 taken through lines 2—2.
Figure 4:
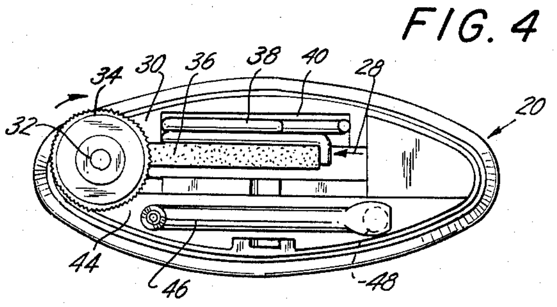
FIG. 4 is a top view of the lighter of FIG. 1 with its cover removed.
Figure 3:
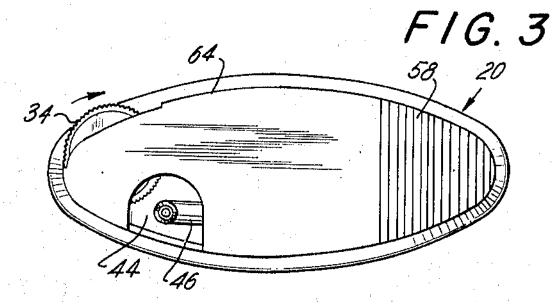
FIG. 3 is a top view of the lighter of FIG. 1 with its cover attached.
Figure 5:
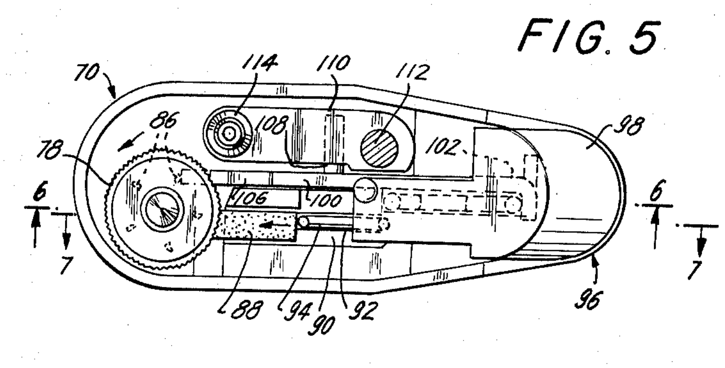
FIG. 5 is a top view of a lighter constituting a second embodiment of the present invention, and shown with its cover removed.

The lighter shown in FIGS. 1 to 4 comprises a body member 20 formed of a block of synthetic resin material such as plastic and is provided with an enlarged recess 22 in its lower portion and a plurality of smaller recesses in its upper portion. The enlarged recess 22 is closed at the bottom by a base element 24 which is either welded or adhesively secured thereto so as to form therein a pressure tight fuel container or reservoir 26. The upper portion of the body member has a grooved or recessed upper surface including an elongated flint guiding recess 28 which extends horizontally along the top of the lighter and which opens into a sparking wheel cavity 30. A stub axle 32 projects upwardly into the sparking wheel cavity and has rotatably mounted thereon a peripherally serrated sparking wheel 34. A flint element 36 is guided in the flint guiding recess 28 toward the peripherally serrated surface of the sparking wheel 34 and is urged thereagainst by means of a V-shaped spring 38 which extends into a spring cavity 40 in the vicinity of the flint guiding groove. There is also provided a fingerpiece recess 42 and a burner cavity 44, the burner cavity being in communicaion with the flint guiding recess 28 and sparking wheel cavity 30; and the fingerpiece recess 42 extending between the burner cavity 44 and a point external to the lighter body.

A burner is provided in the form of a burner tube 46 having a flattened, bent portion 48 which passes through an aperture 50 to a point within the reservoir 26. The flattened, bent portion is resiliently constrictable so as to permit control of gas flow therethrough.

A manual flame control is provided in the form of a fingerpiece 52 which also may be formed of plastic and which has two side lugs or axles 54 which engage in vertical slots 56 formed on either side of the fingerpiece recess, and which permit pivotal movement of the fingerpiece on the lighter. One end of the depressible fingerpiece extends out from the body of the lighter and has a finger engaging portion 58 which is depressible by the user of the lighter. The other end of this lever terminates in a two pronged fork 60, the two prongs of which form a claw which engages the burner tube 46 at a point beyond the bent portion. The top of the fingerpiece is formed with a blade 62 which acts as a spring and bears against a cover member 64 which closes the top part of the lighter. It will be noted that the cover member 64 extends over the flint guiding recess 28 and the sparking wheel cavity 30 to hold the flint element, sparking wheel and the flint biasing spring in operative positional relationship on the lighter itself. The cover member 64 also forces downwardly upon the resilient blade of the depressible fingerpiece so as to bias the fingerpiece to an undepressed position, which preferably, is commensurate with a fully constricted condition in the flattened bent portion 48 of the burner tube 46.

It is to be noted that the various recessess in the upper portion of the lighter extend downwardly from and are exposed to the cover member 64 so that the various operative elements such as the burner tube, fingerpiece, sparking wheel, flint element and biasing spring may easily and conveniently be inserted in a downward direction and easily and conveniently secured in place simply by attaching the cover member to the top of the lighter.

A second embodiment, shown in FIGS. 5 to 9, comprises a hollow body portion 70 which may be of plastic or other synthetic material and in which is formed a pressure tight fuel reservoir 72 for maintaining a gas such as butane in its liquefied state. The reservoir 72 is closed at its upper end by an upper wall 74 which may conveniently be secured in position by means of a suitable adhesive and which in turn is formed and recessed for mounting various operative elements of the lighter. As shown most clearly in FIG. 6, the upper wall 74 has formed thereon a stub axle 76 which rises upwardly from a point near the left end of the wall and which mounts a sparking wheel 78 for rotation thereon. It will be noted that the sparking wheel shown in this embodiment is formed from a peripherally serrated outer shell 80 of a suitable hard material such as steel, and a core 82 of a softer material such as plastic. The softer core permits rotation of the sparking wheel about the stub axle 76 with a minimum of wear on either part. The lower face of the sparking wheel is also provided with a plurality of downwardly depending projections or pins 86 which are arranged in a circle about the wheel axis. The purpose of these pins will become apparent in connection with the description of the remaining portions of the lighter.

A flint element 88 is housed in an elongated groove 90 cut into the extending horizontally along the upper surface of the upper wall 74. The flint element is guided within the groove 90 and is biased against the peripherally serrated surface of the sparking wheel 78 by means of a V-shaped wire flint spring 92 accommodated in a spring recess 94 also formed in the upper wall 74.

Figure 6:
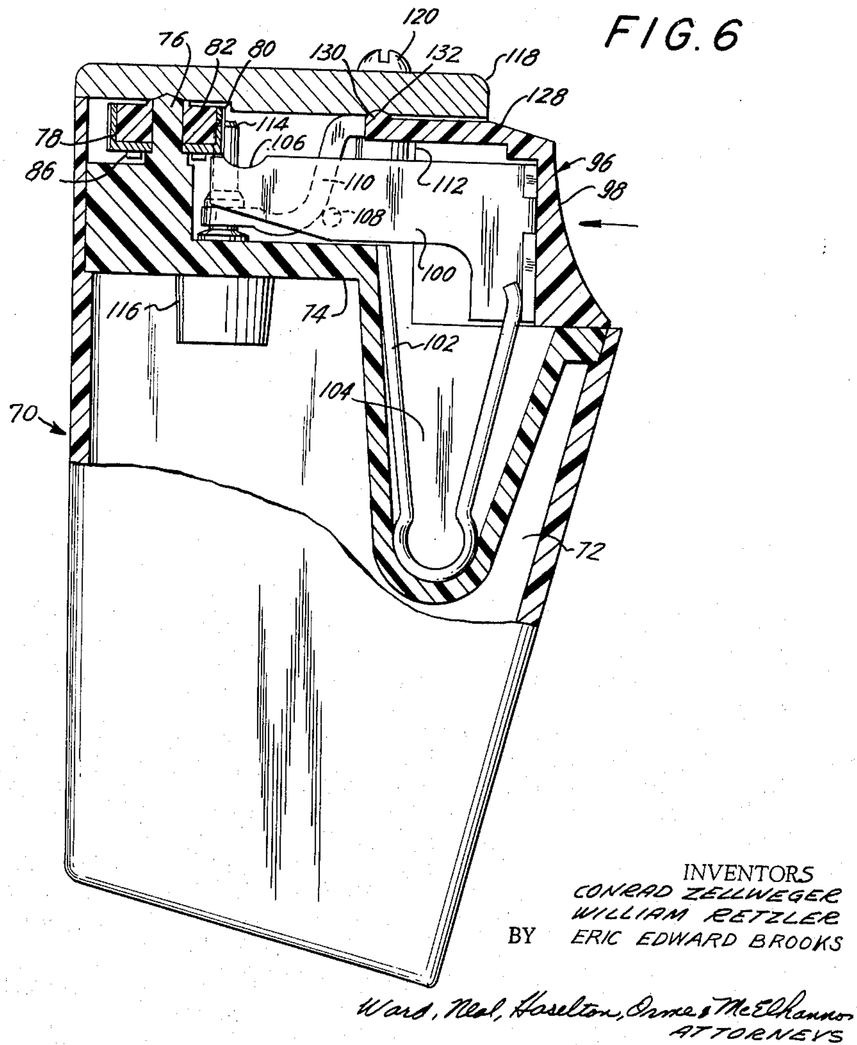
FIG. 6 is a side elevation showing the lighter of FIG. 5 with its cover attached and taken partially in section along lines 6—6 of FIG. 5.
Figure 7:
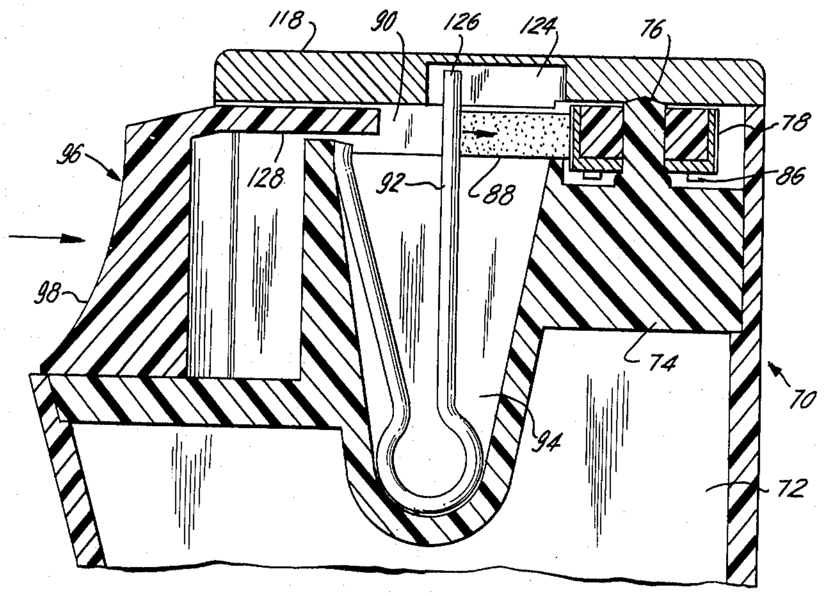
FIG. 7 is a fragmentary section view taken along lines 7—7 of FIG. 5.
Figure 8:
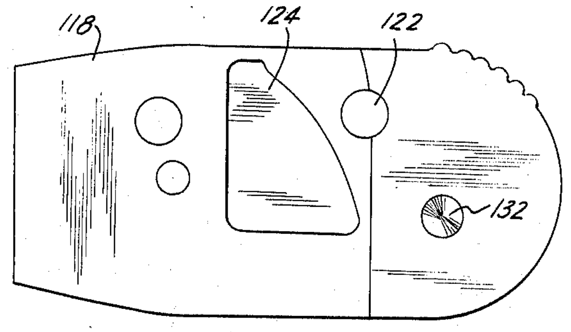
FIG. 8 is a bottom view showing the underside of the cover of the lighter of FIGS. 6 and 7.

The lighter is provided with a fingerpiece indicated generally at 96. The fingerpiece includes a finger engaging portion 98 and a flat, generally resiliently bendable elongated extension 100 which is slidably movable along the upper wall 74. The fingerpiece is biased toward an undepressed or outward position (to the right as seen in FIG. 6) by means of a V-shaped fingerpiece spring 102 which is also accommodated in a recess or cavity 104 formed in the upper wall. When the fingerpiece is depressed (toward the left), the outer end of the extension 100 moves below the lower face of the sparking wheel 78 and engages one of its projections or pins 86 thereon. As the fingerpiece is further depressed the extension 100 pushes against the pin and rotates the sparking wheel. Adjacent the outer end of the fingerpiece extension there is a cutaway portion 106 which provides clearance for the projections or pins 86 of the wheel as it is rotated by depression of the fingerpiece. When the fingerpiece is released, it is returned to its inoperative position by the fingerpiece spring 102, and because of the bendability of the extension 100, it may return to its original position without causing any reverse rotation of the sparking wheel. It can be seen that this arrangement is a form of ratchet mechanism which enables the flint wheel to be rotated uni-directionally upon successive depression and release of the fingerpiece.

The fingerpiece extension is also formed with a laterally projecting cam element 108, which underlies and engages a cam follower member 110. The cam follower member is in the form of an elongated spring attached at one end to a pedestal 112 on the upper wall 74, and at the other end to a movable nozzle 114 on a burner valve 116 which extends out through the upper wall from the fuel reservoir 72. The resiliency of the cam follower member is such that it normally biases the movable nozzle 114 in a downward or valve closing position. Depression of the fingerpiece and consequent inward movement of the extension 100 and cam element 108, however, causes the cam follower member 110 to rise and lift the nozzle and open the burner valve.

The sparking wheel 78, flint element 88 and the depressible fingerpiece 96 are held in operative position for movement in their respective recesses and cavities as described above by means of a cover member 118 which is pivotally mounted on the pedestal 112 by means of a screw 120. The cover member is formed with an aperture 122 which, when the cover member is in its normal position, overlies the burner to permit the ignited gases emitted therefrom to escape. When the screw 120 is loosened, the cover member may be rotated to expose the flint element 88 for convenient replacement. The cover member is also formed on its underside with a recess 124 which accommodates an extended upper end 126 of the flint spring 92. The recess is especially shaped such that when the cover plate is rotated on the pedestal, the surfaces of the recess engage the spring and draw it out of engagement with the flint element, thus enabling the flint to be removed conveniently.

It will be appreciated that the flint spring 92, and the fingerpiece spring 102, may be formed as a single member having the shape of a W with the left hand half shorter than the right hand half. In such case, this single integral spring would be accommodated in a single suitably disposed recess formed in the upper wall 74.

In order to provide for a form of snap action in the mechanism, the fingerpiece is formed with a resilient upper extension 128 which passes under the cover member and is formed with a nipple 130 which, in the inactive or undepressed position of the fingerpiece, engages a corresponding depression 132 formed in the undersurface of the cover member. This prevents movement of the fingerpiece until sufficient force has been built up to disengage the nipple 130 from the depression 132. When this occurs the resisting force drops immediately and the large built-up force on the fingerpiece causes rapid movement and consequent improved sparking for positive ignition.

Figure 9:
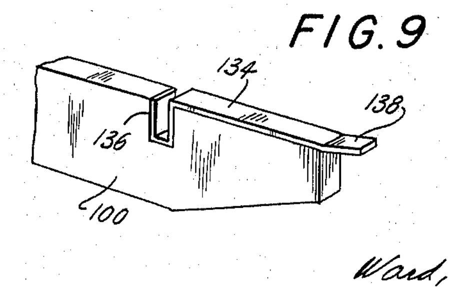
FIG. 9 is a fragmentary perspective view of an alternate construction for a portion of one of the elements of the lighter of FIGS. 5–7.

FIG. 9 illustrates a modification of the operating mechanism. In this case the fingerpiece extension 100 is inflexible but is provided with a flat leaf spring 134 which is held in position by forming the extension with a slot 136 into which one end of the spring is forced. The other end of the spring is inclined slightly upwards as at 138 toward the underface of the sparking wheel so as to engage the projections as the fingerpiece is depressed. The resilience of the inclined portion of the spring enables it to over-ride the projections when the fingerpiece is returned to its inoperative position.

Figure 11:
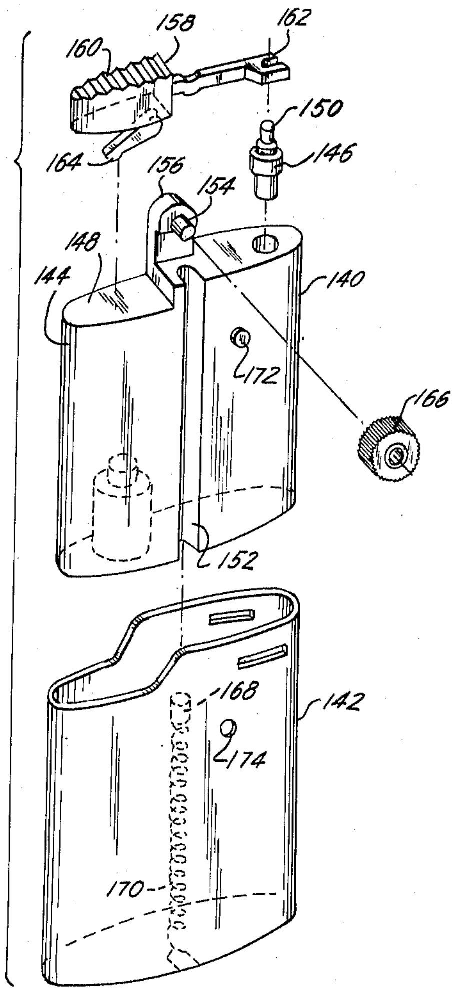
FIG. 11 is an exploded view illustrating the relationship of the parts of the lighter of FIG. 10.
Figure 10:
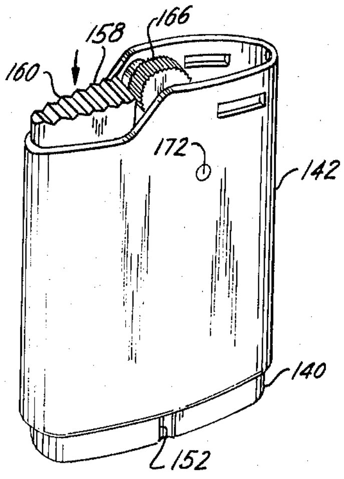
FIG. 10 is a perspective view of a lighter constituting a third embodiment of the present invention.
Figure 12:
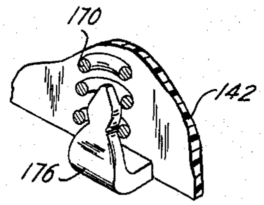
FIG. 12 is a fragmentary perspective view of a lower portion of the lighter of FIG. 10.

The lighter shown in FIGS. 10 to 12 includes a body member 140 and a cover member 142 which slides down over the body member in a sheath type enclosing arrangement. The body member 140 may be formed of plastic or similar material and has formed therein a fuel reservoir 144. A burner valve 146 extends into the reservoir through a top wall 148 on the body member, and is provided with a reciprocally movable nozzle 150 which controls the flow of fuel from the reservoir 144. A flint groove or recess 152 is cut into and extends up the side of the body member 140 toward a stub axle 154 mounted horizontally a short distance above the top wall 148 of the body member. The stub axle 154 may be integral with an upwardly extending standard 156 which itself may be integral with the body top wall 148.

A fingerpiece 158 having a finger depressible portion 160 at one end and a forked arrangement 162 at the other end is mounted to pivot under the stub axle 154 on the upwardly extending standard 156. The forked arrangement of the fingerpiece engages the nozzle 150 of the burner valve 146 so that pivotal movement of the fingerpiece causes opening and closing of the valve. A biasing arm 164 is resiliently attached to, or is formed as a resilient portion of the finger engaging end of the depressible fingerpiece. This biasing arm presses down against the lighter body member to bias the fingerpiece toward a valve closing position.

A peripherally serrated sparking wheel 166 is rotatably mounted on the stub axle 154 and is held in place along with the depressible fingerpiece by means of the cover member 142.

A flint element 168 is located in the flint groove 152 and is biased against the serrated surface of the sparking wheel 166 by means of a flint spring 170 also located in the flint groove. The cover member 142 extends over the flint groove 152 and holds the flint element 168 and flint spring 170 in proper operative relationship to the sparking wheel.

The cover member 142 is generally elliptical in its lateral cross section, as is the body member. However, the cover member is somewhat resilient and has a slightly larger major and somewhat smaller minor cross sectional dimension than the body member, so that it normally holds itself in position on the body member by pressing inwardly against the sides of the body member. Also, the cover member may be removed simply by pressing from front to back to spring its sides out and away from the body member. A small projection 172 may be provided in the body member to engage a corresponding hole 174 in the cover member for better holding these items together.

As shown in FIG. 12, the lower portion of the cover member has a hook like projection 176 which is bent inwardly and upwardly to secure the lower end of the flint spring 170 to the cover member 142. In normal assembly the flint spring 170 is pushed upwardly against the flint element by the cover member. However, when the cover member is slid down on the body member to expose the flint element, the flint spring becomes pulled down and away from the flint element thus releasing it for replacement.

It will be appreciated that although the cover configuration in this third embodiment is somewhat different than that of the two preceding embodiments, it nevertheless cooperates with the body member in the same manner, i.e., it serves to hold the various operative lighter elements in their operative positional relationship in recesses formed between the body and cover members.

The body member and cover member, it will be noted, are arranged to enclose and maintain the sparking wheel in operative relationship to the remaining elements of the lighter and at the same time to expose a sector of the sparking wheel generally away from the burner valve. This permits convenient manual rotation of the sparking wheel and at the same time allows the finger engaging portion of the depressible fingerpiece to be positioned such that the user's finger, in coming off the sparking wheel, naturally falls upon the fingerpiece and opens the valve.

Figures 13, 15, 16:
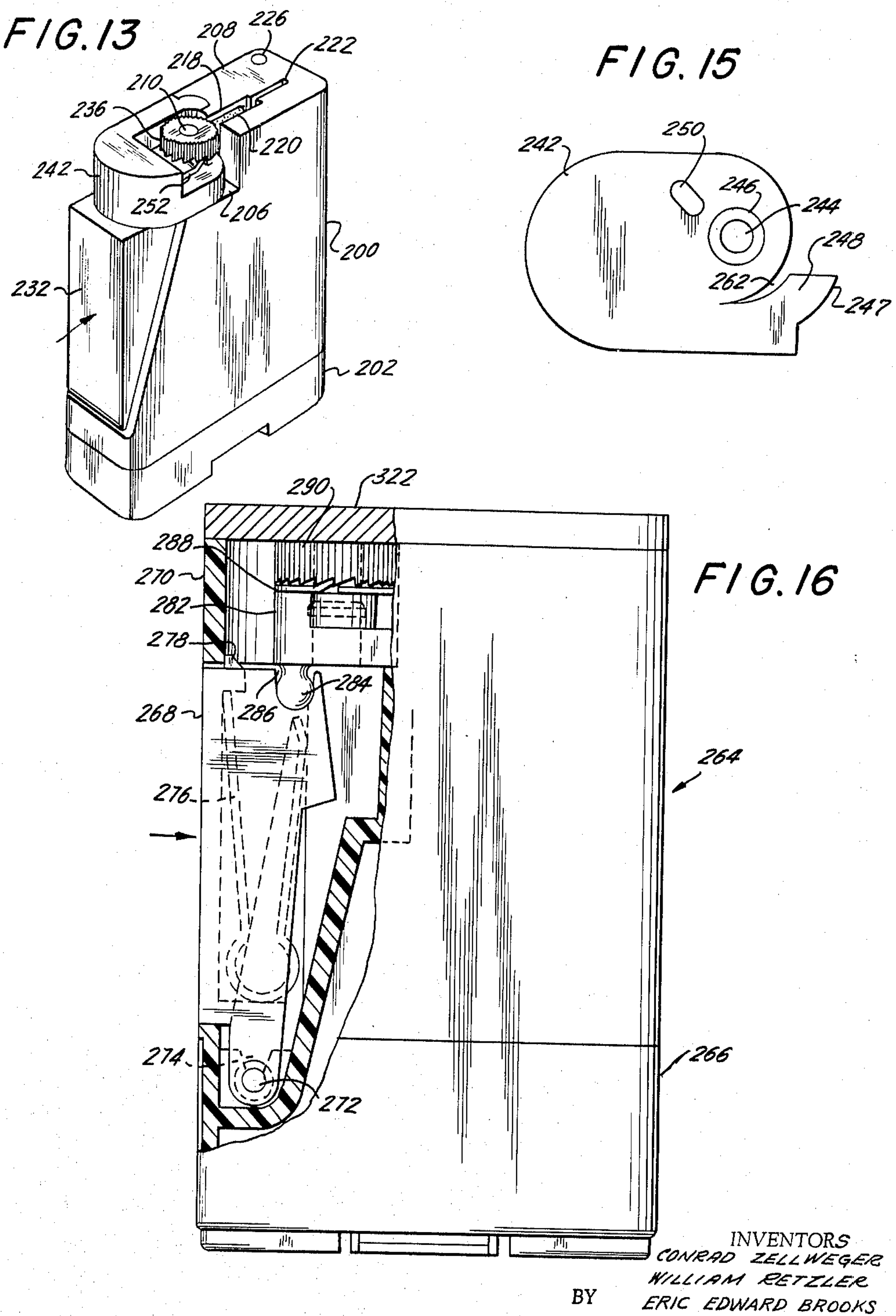
FIG. 13 is a perspective view of a lighter constituting a fourth embodiment of the present invention, and shown with its cover removed.
FIG. 15 is a bottom view of a cam element of the lighter of FIG. 13.
FIG. 16 is a side elevation taken partially in section, of a lighter constituting a fifth embodiment.
Figure 14:
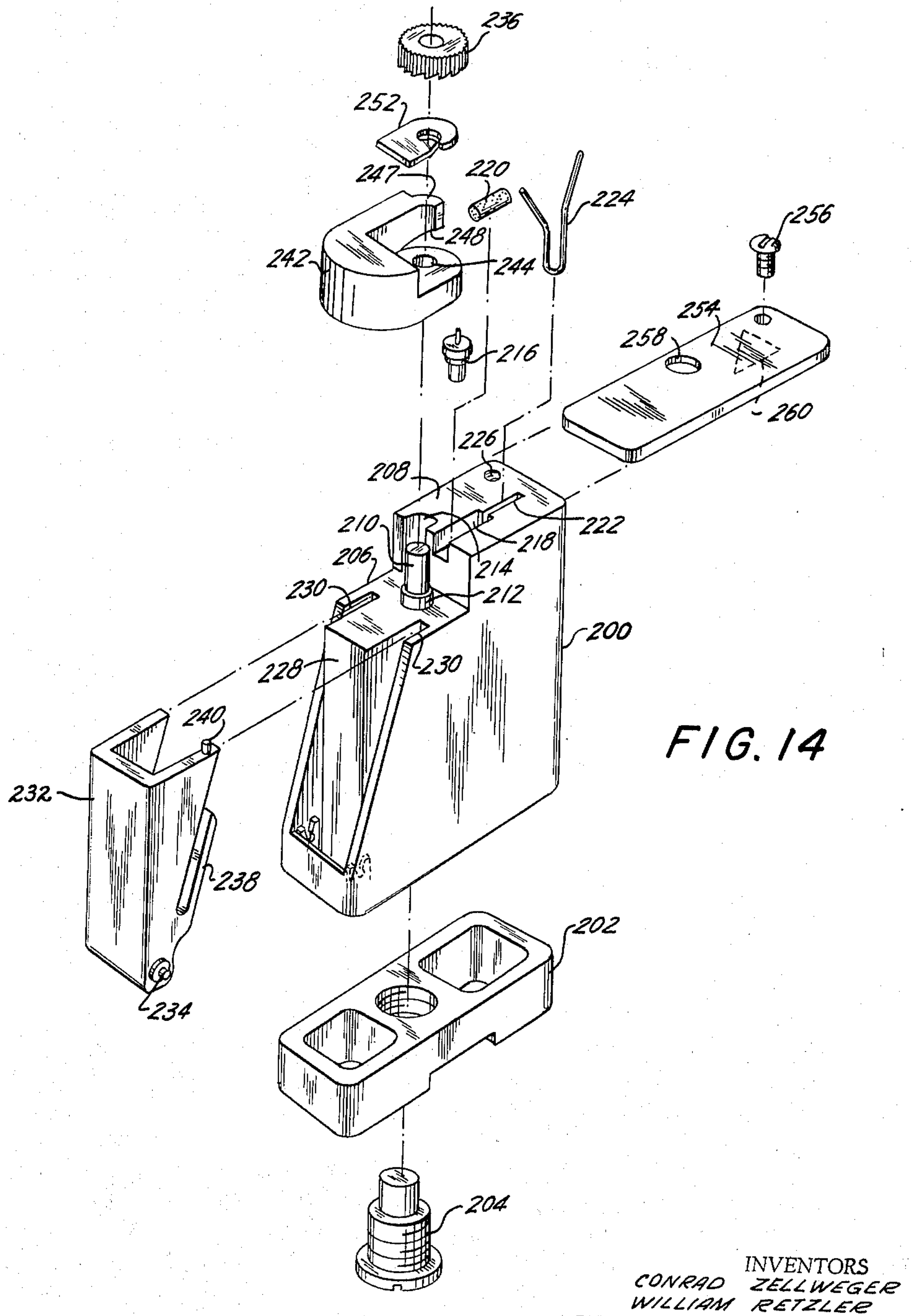
FIG. 14 is an exploded view illustrating the relationship of the parts of the lighter of FIG. 13.

Referring next to FIGS. 13 to 15, the lighter there shown comprises a body 200 which may be formed of a suitable plastic by a molding operation, or of a metal by means of a diecasting operation. The body 200 is hollow so as to provide a reservoir for liquefied fuel and is closed at its lower end by a base 202 which may be secured to the body by welding or by means of adhesive. The base also carries an inlet valve 204. The upper end of the body 200 is formed, as shown, with a flat shelf-like portion 206 and an upper flat portion 208. A stub axle 210 extends vertically from the flat portion 206 and may be formed integrally with the body during the molding or diecasting operation, or may be made as a separate part formed, for example, of steel, one end of which is molded or cast into the body or is secured, for example by means of adhesive, into a hole formed in the body. As shown, the stub axle 210 is formed with a collar 212 of increased diameter adjacent the upper flat shelf-like portion 206 of the body. The raised part of the body which terminates in the flat portion 208 is formed in its side face with a groove 214 at the lower end of which a fuel burner 216 is positioned and in its top face with an open channel 218 for receiving and locating a flint 220 and a recess 222 for a flint spring 224 and with a threaded bore 226.

One side 228 of the body 200 is grooved as at 230 to receive the sides of a fingerpiece 232 which is of channel shape and which is pivotally mounted at its lower end to the body for movement about an axle 234 which extends at right angles to the axis of the stub axle 210 about which a sparking wheel 236 rotates. The fingerpiece 232 is also provided with an integral spring portion 238 which bears against the side 228 and at its upper end with an upstanding stud 240.

A cam member 242 is rotatably mounted on the stub axle 210, the member 242 being formed with a bore 244 to receive the axle, and a recess 246 on its under surface to receive the collar 212. The cam member 242 is also formed with a portion 247 which carries on its under face a cam surface 248 that bears against the stem of a shut-off valve which protrudes from the fuel burner 216 and with a groove 250 on its under face which receives the stud 240 on the fingerpiece 232. The groove 250 extends along a line which passes through the center of the bore 244 and extends at an angle of 45° to the direction of movement of the stud 240. The cam member 242 is cut away to receive a clutch spring 252 and the sparking wheel 236, both of which are mounted on the stub axle 210. The actuating mechanism comprising the cam member 242, the clutch spring 252 and the sparking wheel 236, as well as the flint 220 and the flint spring 224, are retained in position on the lighter body by means of a cover plate 254 which is secured to the body by means of screw 256 which engages in the threaded bore 226.

As shown, the cover plate 254 is formed with an aperture 258 which in the normal position of the cover plate lies over the burner 216 to provide passage for the flame. The underside of the cover plate 254 is formed with a recess 260 into which that end of the flint spring 224 that engages the flint 220 extends. If the cover plate is rotated from its normal position counterclockwise about the screw 256, the side of the recess acts as a cam to move the spring end to the right, thus to relieve pressure on the flint. This movement of the cover plate also uncovers the flint which is thus easily replaceable. At the same time, access is provided to the sparking wheel 236 and the actuating mechanism.

In operation of the lighter when the fingerpiece 232 is moved from its inoperative position towards the body of the lighter, the movement of the stud 240 in the groove 250 causes the cam member 242 to rotate approximately 90° about the stub axle 210. As this member moves, its cam surface 248 moves off the burner valve stem which is thus permitted to rise to open the valve. Simultaneously, the sparking wheel 236 is rotated by the movement of the clutch spring 252. When the fingerpiece is released, its spring portion 238 returns it to its inoperative position and the movement of the cam member, occasioned by engagement of the stud 240 in the slot 250 causes the cam surface to ride up over the burner valve stem thereby to close the valve.

In this embodiment of the invention it is not essential that the opening of the valve should be controlled directly by the cam surface 248 since this surface could be arranged in such a manner on the cam member 242 as to operate a form of fork lift which in turn operates to control the valve of the fuel burner. In some circumstances it is desirable that the cam surface 248 shall be resilient and this may be achieved by providing a saw cut 262 in the portion 247, as shown, parallel with the cam surface 248. In an alternative arrangement, the cam surface may be arranged on the clutch spring 252 and may act directly on the valve or indirectly through a fork lift.

Referring now to the embodiment illustrated in FIGS. 16 to 19, the lighter there shown comprises a body 264 formed as a molding of a suitable plastic which defines with base 266 a fuel reservoir and is provided with suitable housings and recesses for receiving the various operative parts. At its left hand side (FIG. 16) the body is formed with a deep recess for receiving a fingerpiece 268 and an aperture in its wall 270 to receive the left hand side of the fingerpiece which extends flush with the outer wall. The lower end of the fingerpiece is provided with trunnions 272 which are a push fit into bearing slots 274 formed in the base of the recess. The fingerpiece is urged into the inoperative position shown by a spring 276 and is located in this position by a projection 278 which engages the wall 270. Rising vertically from the recess and at right angles to the pivotal axis of the fingerpiece 268 is a stub axle 280. Mounted on this axle is a cam member 282 which is formed with a depending ball 284, that engages in a slot 286 formed in the upper end of the fingerpiece 268, the arrangement being such that as the fingerpiece is moved from its inoperative position (to the right in FIG. 16) the engagement of the slot 286 with the ball 284 causes the cam member 282 to rotate about the stub axle 280. Arranged on the stub axle 280 above the cam member 282 is a clutch spring 288 and a sparking wheel 290; the clutch spring being loosely retained on the sparking wheel by forming the latter with a collar 292 having an enlarged head over which the spring 288 is stressed. This spring is also prevented from turning relative to the cam member 282 by forming it with a lug 294 which is received in a hole 296 in the cam member.

The upper part of the lighter body is also formed with a housing for a fuel burner valve 297 and an aperture leading from this housing into the reservoir into which this valve is screwed or otherwise secured. The valve 297 is provided with an annular member 298 for adjusting flame height and which protrudes through an aperture in the sidewall of the body.

The burner valve 297 also has a shut-off valve stem 300 protruding upwardly therefrom, the stem also acting as the nozzle of the burner, the valve is adapted to be opened to permit the escape of gas when the stem is lifted. For this purpose the stem extends through an aperture in a spring member 302, to which it is secured by a sheet metal nut 304 and one end 306 of this member which is folded upon itself is secured in an aperture 308 in the top wall of the body while its other end 310 rests on a cam surface 312 formed on the cam member 282. This cam surface is so shaped that as soon as the cam member is rotated, the end 310 of the spring member 302 is raised, thereby to lift the shut-off stem 50. The spring member is maintained in this raised position during continued rotation of the cam member. The top wall of the lighter body is also formed with an open groove 314 in which a flint is located and guided towards the sparking wheel 290 under the pressure of a flint spring which may also be located in this groove.

Figures 17, 19:
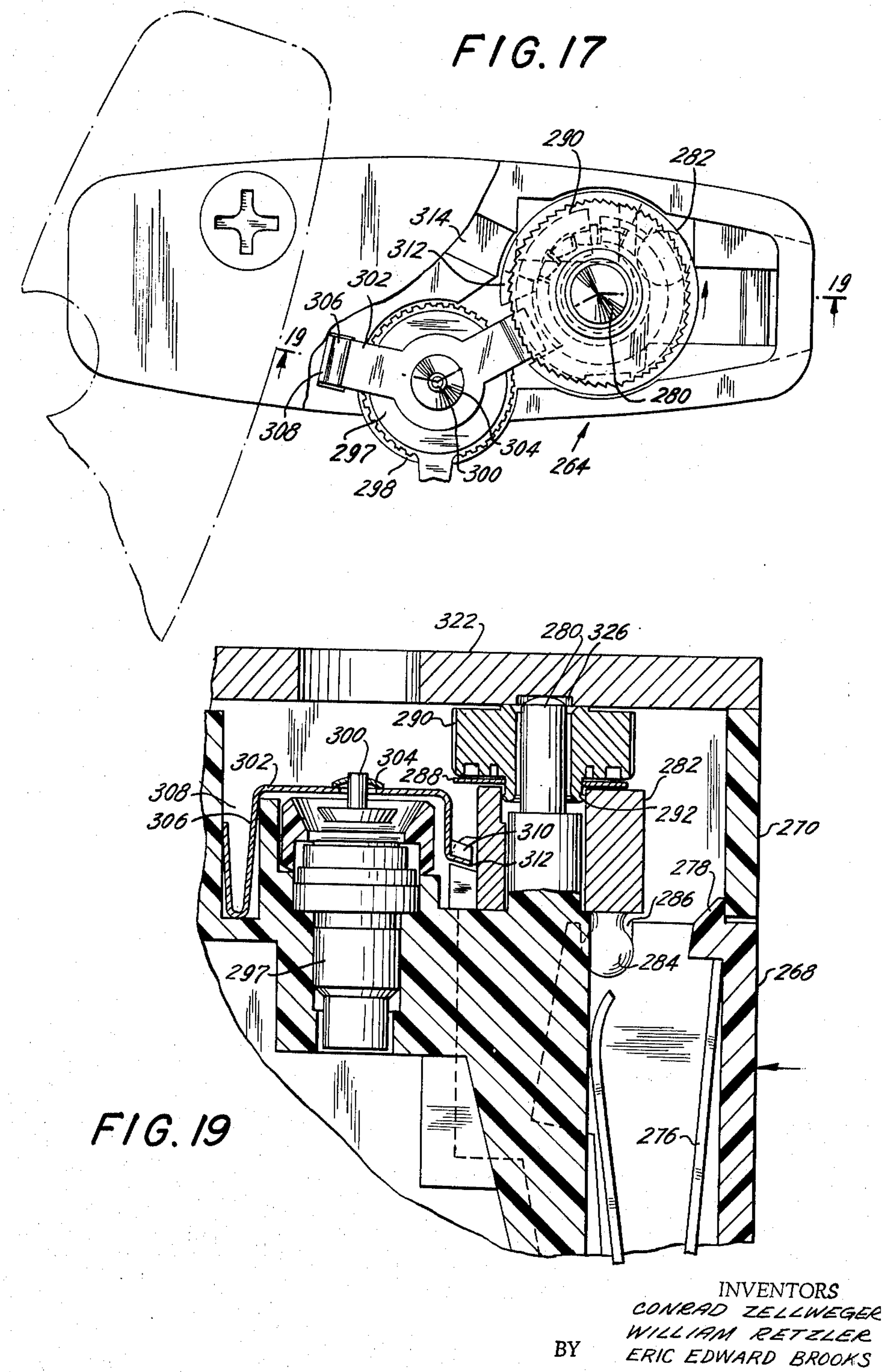
FIG. 17 is a top view of the lighter of FIG. 16 shown with its cover pivoted for flint replacement.
FIG. 19 is a fragmentary section view of the lighter of FIG. 17.
Figure 18:
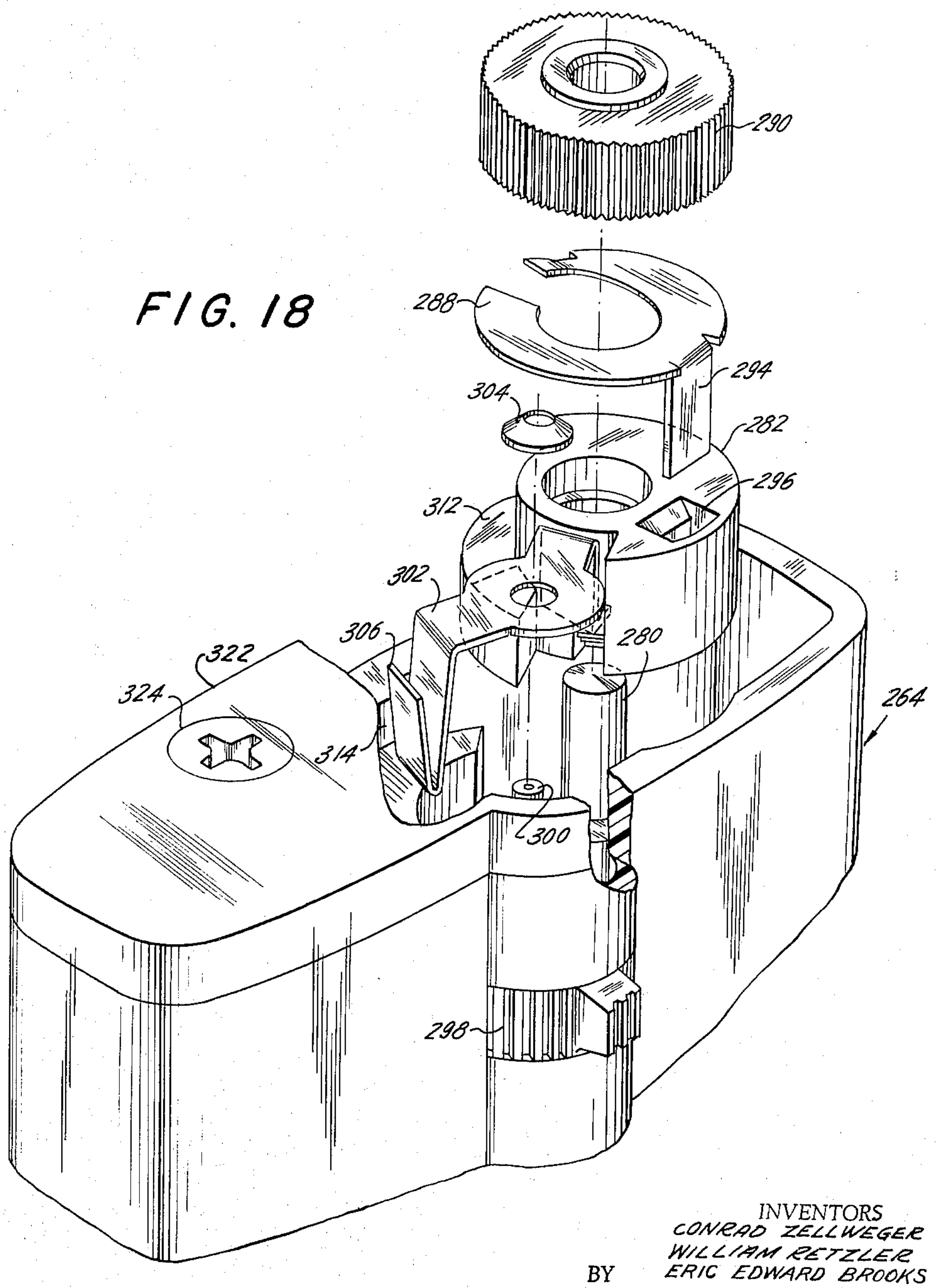
FIG. 18 is an exploded view of the upper portion of the lighter of FIG. 17.

The various parts are protected and held in operative position by means of a cover plate 322 which is secured over the top wall of the lighter body by a single screw 324. This cover plate may be located in its normal position by the engagement of the end of the stub axle 280 with a recess 326 in the cover plate but may be turned away from this position about the screw 324 as indicated in FIG. 17 to provide access to the various parts including the flint. Conveniently, the pivotal movement may be caused to relieve the flint of the pressure of the flint spring thereby to facilitate replacing the flint.

In operation, movement of the fingerpiece 268 inwardly of the body by the pressure of the user's fingers causes the cam member 282 and the sparking wheel 290 to be rotated and at the same time the movement of cam surface 312 causes the burner valve to open. When the user relaxes the pressure of his fingers, the fingerpiece is returned by action of its spring 276 to the position shown. At the same time the cam member 282 is returned to its original position and permits the burner valve to close.

As may be appreciated from the foregoing description, this embodiment of the improved lighter of this invention is particularly suitable for assembly by automatic machinery since once the burner valve has been secured in position, all the operative parts may be placed in position each by a movement in the same direction and they are then secured in position by the application and fastening of the cover plate.

Having thus described my invention with particular reference to the preferred form thereof, it will be obvious to those skilled in the art to which the invention pertains, after understanding my invention, that various changes and modifications may be made therein without departing from the spirit and scope of my invention, as defined by the claims appended thereto.

What is claimed as new and desired to be secured by Letters Patent is:

1. A pyrophoric gas lighter comprising a reservoir for containing highly volatile fuel under high pressure in its liquid form, a burner valve assembly including an outer casing sealably engaged with and extending through one wall of said reservoir and containing a fluid passageway which extends into said casing, said fluid passageway being openable and closeable by movement of a valve control element relative to said reservoir, a sparking wheel having a serrated surface and mounted for rotation about a stub axle integral with said reservoir and extending from the outer surface thereof in the vicinity of said burner valve assembly, a recess formed in the outer surface of said reservoir, a flint element located in said recess and guided thereby toward said sparking wheel, resilient means positioned in said recess in engagement with said flint to urge said flint element against the serrated surface of said sparking wheel and a cover member attached to the outer surface of said reservoir and extending over said sparking wheel and said recess to hold said sparking wheel, flint and resilient means in cooperative relationship with respect to said reservoir.

2. The lighter described in claim 1 wherein said recess extends along one side of said reservoir and said cover member surrounds said reservoir to hold said flint element in place in said recess, said cover piece being slideable on said reservoir to expose said flint element.

3. The lighter described in claim 2 wherein said resilient means is a coil compression spring, a portion of which engages said cover member whereby sliding of said cover member to expose said flint element retracts said resilient means to facilitate removal of the exposed flint element.

4. A pyrophoric gas lighter comprising a reservoir for containing highly volatile fuel under high pressure in its liquid form, a burner valve assembly including an outer casing sealably engaged with and extending through one wall of said reservoir and containing a fluid passageway which extends into said casing, said fluid passageway being openable and closeable by movement of a valve control element relative to said reservoir, a sparking wheel having a serrated surface and mounted for rotation about a stub axle extending integrally from the outer surface of said reservoir in the vicinity of said burner valve assembly, a recess formed in the outer surface of said reservoir, a flint element located in said recess and guided thereby toward said sparking wheel, resilient means in said recess acting to urge said flint element against the serrated surface of said sparking wheel, and a cover member attached to said reservoir and moveable thereon between a first position covering said sparking wheel, flint element and resilient means and a second position exposing said flint element for allowing replacement of same.

5. A pyrophoric gas lighter comprising a reservoir for containing highly volatile fuel under high pressure in its liquid form, a burner valve assembly including an outer casing sealably engaged with and extending through one wall of said reservoir and containing a fluid passageway which extends into said casing, said fluid passageway being openable and closeable by movement of a valve control element relative to said reservoir, a sparking wheel having a serrated surface and mounted for rotation about a stub axle extending from the outer surface of said reservoir in the vicinity of said burner valve assembly, a recess formed in the outer surface of said reservoir, a flint element located in said recess and guided thereby toward said sparking wheel, resilient means in said recess acting to urge said flint element against the serrated surface of said sparking wheel, a cover member attached to said reservoir and moveable thereon between a first position covering said sparking wheel, flint element and resilient means and a second position exposing said flint element, said cover member being operatively connected to said resilient means to retract same from said flint element upon movement of said cover member to its said second position.

6. A pyrophoric gas lighter comprising a reservoir for containing highly volatile fuel under high pressure in its liquid form, a burner valve assembly including an outer casing sealably engaged with and extending through one wall of said reservoir and containing a fluid passageway which extends into said casing, said fluid passageway being openable and closeable by movement of a valve control element relative to said reservoir, a sparking wheel having a serrated surface and mounted for rotation about a stub axle extending from the outer surfaces of said reservoir in the vicinity of said burner valve assembly, a recess formed in the outer surface of said reservoir, a flint element located in said recess and guided thereby toward said sparking wheel, resilient means in said recess acting to urge said flint element against the serrated surface of said sparking wheel, a cover member pivotally mounted on said reservoir and moveable from a flint enclosing to a flint exposing position said cover member being provided with a cam surface which engages with, and exerts a retracting force away from said sparking wheel upon a portion of said resilient means upon movement of said cover member to said flint exposing position.

7. A pyrophoric lighter comprising a block of material having a hollowed out fuel containing lower portion and a recessed upper portion, said upper portion including an elongated flint guiding recess one end of which opens out on a sparking wheel recess, said upper portion further including a burner recess in communication with said sparking wheel recess in the vicinity of said flint guiding recess, an upwardly extending stub axle formed integrally from said material and projecting into said sparking wheel recess, a sparking wheel having a serrated surface and rotatably mounted on said stub axle, a flint element located in said flint recess, a spring element located in said recess and stressed to bias said flint element against said sparking wheel, a burner means including a closeable fluid passageway extending between said fuel containing portion and said burner recess, a lower cover attached to the bottom of said lower portion for sealing same, and an upper cover removably attached to said upper portion and covering said sparking wheel, flint element and spring element for holding said sparking wheel and elements in cooperative relationship thereon.

8. A pyrophoric gas lighter comprising a reservoir for containing highly volatile fuel under high pressure in its liquid form, one wall of said reservoir being formed with an elongated groove one end of which opens to a cavity, a stub axle integral with and extending from said reservoir into said cavity substantially perpendicular to the longitudinal axis of said groove, a sparking wheel having a serrated surface and rotatably supported on said stub axle, a flint element resting in said elongated groove and guided thereby toward the said sparking wheel, a spring element stressed against said flint element to urge it against the serrated surface of said sparking wheel, a cover member fastened to said reservoir and extending over said groove and cavity to hold said sparking wheel, flint element and resilient means in cooperative relationship relative to said reservoir, a burner valve assembly including a closeable fluid passageway extending outwardly from the interior of said reservoir near said sparking wheel and said flint element and means providing control of fluid flow through said passageway.

9. A pyrophoric gas lighter comprising a reservoir for containing highly volatile fuel under high pressure in its liquid form, one wall of said reservoir being formed with an elongated groove closed at one end and opening to a cavity on the other end, a stub axle integral with said reservoir and extending from the outer surface thereof into said cavity substantially perpendicularly to the longitudinal axis of said groove, a sparking wheel having a peripherally serrated surface and rotatably supported on said stub axle, a flint element resting in said elongated groove and guided thereby toward the serrated surface of said sparking wheel, a spring element stressed between said flint element and said one end of said groove to force said flint element against the peripheral surface of said sparking wheel, a cover member fastened to said reservoir and extending over said groove and cavity to hold said sparking wheel, flint element and resilient means in cooperative relationship relative to said reservoir, a burner valve assembly having an outer casing sealably engaged with and extending through said reservoir near said sparking wheel and said flint element, and fingerpiece means providing control of gas flow through said burner valve assembly.

10. A pyrophoric gas lighter comprising a reservoir for containing highly volatile fuel under high pressure in its liquid form, a burner valve means including an outer casing sealably engaged with and extending through one wall of said reservoir and containing a fluid passageway which extends into said outer casing, said fluid passageway being openable and closeable by movement of a valve control element relative to said reservoir, a sparking wheel having a serrated surface and mounted to rotate about a stub axle extending from the outer surface of said reservoir in the vicinity of said burner valve assembly, a recess formed in the outer surface of said reservoir, a flint element located in said recess and guided thereby toward said sparking wheel, resilient means in said recess acting to urge said flint element against the serrated surface of said sparking wheel, a cover member attached to said reservoir and extending over said sparking wheel and said recess to hold said sparking wheel, flint and resilient means in cooperative relationship, and a fingerpiece retained on said reservoir for movement in a given direction and means operatively interconnecting said fingerpiece and said valve control element whereby depression of said fingerpiece produces opening of said fluid passageway.

11. A pyrophoric gas lighter comprising a reservoir for containing highly volatile fuel under high pressure in its liquid form, a burner valve assembly including an outer casing sealably engaged with and extending through one wall of said reservoir and containing a fluid passageway which extends into said casing, said fluid passageway being openable and closeable by upward and downward movement respectively of a valve control element relative to said reservoir, a sparking wheel having a serrated surface and mounted for rotation about a stub axle integral with and extending from the outer surface of said reservoir in the vicinity of said burner valve assembly, a groove formed in the outer surface of said reservoir, a flint element located in said groove and guided thereby toward the serrated surface of said sparking wheel, resilient means in said groove acting between said reservoir and said flint element to urge the latter against said sparking wheel, a cover member attached to said reservoir and extending over said sparking wheel and said groove to hold said sparking wheel, flint element and resilient means in cooperative relationship, and a fingerpiece retained by said reservoir and cover member for movement therebetween and means operatively interconnecting said fingerpiece and said valve control element whereby depression of said fingerpiece produces opening of said fluid passageway.

12. A pyrophoric gas lighter comprising a reservoir for containing highly volatile fuel under high pressure in its liquid form, a burner valve assembly including an outer casing sealably engaged with and extending upwardly into an upper wall of said reservoir and containing a fluid passageway which extends through said outer casing, said burner valve assembly further including a burner nozzle moveable up and down to control fuel flow from said reservoir, a sparking wheel having a serrated surface and mounted for rotation about a stub axle integral with and extending upwardly from said upper wall of said reservoir in the vicinity of said burner nozzle, a groove formed in said upper wall, a flint element located in said groove and guided by said groove toward the said sparking wheel, a spring element extending within said groove and stressed to urge said flint element toward the serrated surface of said sparking wheel, a cover piece mounted above said upper wall and covering said sparking wheel and groove to maintain said sparking wheel, flint element and spring element in cooperative positional relationship, a fingerpiece extending between and retained by said upper wall and said cover piece for movement relative to said burner valve assembly, and cam means connected between said fingerpiece and burner nozzle to produce actuation of said burner upon movement of said fingerpiece.

13. A pyrophoric ignited gas lighter comprising a gas reservoir constructed with a plurality of outwardly projecting elements which extend from the outer surfaces of said reservoir and which are shaped to form therebetween a narrow, elongated flint guiding channel, a sparking wheel cavity communicating with one end of said flint guiding channel and a burner valve cavity communicating with the intersection of said flint guiding channel and said sparking wheel cavity, said projecting elements being arranged to expose a sector of said sparking wheel cavity away from said flint guiding channel and said burner cavity, a further stub axle shaped outwardly projecting element extending into said sparking wheel cavity approximately perpendicular to the longitudinal axis of said narrow flint guiding channel, a sparking wheel having a peripherally serrated surface and rotatably mounted on said stub axle shaped projecting element, a flint element located in said flint guiding channel, a resilient biasing element stressed to urge said flint element against the peripheral surface of said sparking wheel, a burner valve assembly including a closeable fluid passageway extending from within said reservoir to a point in said burner cavity, a fingerpiece moveably mounted on said reservoir and having a depressible finger engageable portion extending out from said projecting elements near the flint guiding recess end of said sector so that finger rotation of said sparking wheel is naturally followed by depression of said fingerpiece, said fingerpiece further being connected to open said closeable fluid passageway upon depression of its finger engageable portion, means associated with said fingerpiece biasing it to an undepressed position and a cover piece mounted on said projecting elements and covering said recess and cavities to maintain the elements contained therein in operative positional relationship.

14. A pyrophoric gas lighter comprising a reservoir for containing highly volatile fuel under high pressure in its liquid form, a burner valve assembly including an outer casing sealably engaged with and extending upwardly into an upper wall of said reservoir and containing a fluid passageway which extends through said outer casing, said burner valve assembly further including a burner nozzle moveable up and down to control fuel flow from said reservoir, a sparking wheel having a serrated surface and mounted for rotation about a stub axle extending upwardly from said upper wall of said reservoir in the vicinity of said burner nozzle, a flint element located in a groove formed in said upper wall and guided by said groove toward the said sparking wheel, a spring element extending within said groove and stressed to urge said flint element toward the serrated surface of said sparking wheel, a cover piece mounted above said upper wall and covering said sparking wheel and groove to maintain said sparking wheel, flint element and spring element in cooperative positional relationship, a fingerpiece extending between and retained by said upper wall and said cover piece for movement relative to said burner valve assembly and said stub axle and cam means interposed between said fingerpiece and both said burner nozzle and said sparking wheel to produce rotation of said sparking wheel and opening of said fluid passageway upon movement of said fingerpiece.

15. A pyrophoric gas lighter comprising a reservoir for containing highly volatile fuel under high pressure in its liquid form, a burner valve assembly including an outer casing sealably engaged with and extending upwardly into an upper wall of said reservoir and containing a fluid passageway which extends through said outer casing, said burner valve assembly further including a burner nozzle moveable up and down to open and close respectively said fluid passageway, a sparking wheel having a serrated surface and mounted for rotation about a stub axle extending upwardly from said upper wall of said reservoir in the vicinity of said burner nozzle, a flint element located in a groove formed in said upper wall and guided by said groove toward the said sparking wheel, a spring element extending within said groove and stressed to urge said flint element toward a serrated surface of said sparking wheel, a cover piece mounted above said upper wall and covering said sparking wheel and groove to maintain said sparking wheel, flint element and spring element in cooperative positional relationship, a fingerpiece extending into and moveable within a recess formed by said cover element and said upper wall, said recess being formed to guide said fingerpiece generally inward toward and outward away from said stub axle and said valve assembly, resilient means urging said fingerpiece away from said stub axle and valve assembly, cam and follower means interconnecting said fingerpiece and burner nozzle to effect lifting of the latter upon inward movement of said fingerpiece and a pusher element on said fingerpiece located to abut with projections extending from said sparking wheel for rotating said sparking wheel upon inward movement of said fingerpiece.

16. A pyrophorically ignited gas lighter comprising a gas reservoir constructed with a plurality of outwardly projecting elements which extend from the outer surface thereof and which are shaped to form therebetween a narrow, elongated flint guiding channel, a sparking wheel cavity communicating with said flint guiding channel, a burner valve cavity communicating with the intersection of said flint guiding channel and said sparking wheel cavity and a fingerpiece cavity communicating between said burner valve cavity and a point outside said projecting elements, a further stub axle shaped outwardly projecting element extending into said sparking wheel cavity approximately perpendicular to the longitudinal axis of said narrow flint guiding channel, a sparking wheel having a peripherally serrated surface and rotatably mounted on said stub axle shaped projecting element, a flint element located in said flint guiding channel, a resilient biasing element stressed to urge said flint element against the peripheral surface of said sparking wheel, a burner valve assembly including a closeable fluid passageway extending from within said reservoir to a point in said burner valve cavity, a fingerpiece extending out from said fingerpiece cavity and moveable therein to actuate said burner valve assembly, a cover piece attached to said body and adapted to maintain said flint element, said resilient biasing element, said sparking wheel and said fingerpiece in cooperative relationship in their respective positions among said outwardly projecting elements.

17. A pyrophoric lighter comprising a gas reservoir sealable to maintain gas fuel under high pressure in its liquefied state therein, a plurality of projections extending upwardly from a top wall of said reservoir and forming therebetween a plurality of recesses including a horizontally extending elongated flint recess which opens at one end to a sparking wheel recess, a burner recess in communication with the intersection of said sparking wheel and flint recesses and a fingerpiece recess extending between a point outside said projections and said burner recess, said projections further including a stub axle extending upwardly into said sparking wheel recess, a sparking wheel having a serrated surface and rotatably mounted on said stub axle, a flint element and a spring element extending within said flint recess, said flint element being urged by said spring element against the serrated surface of said sparking wheel, a burner tube extending outwardly from within said reservoir to a point in said burner cavity, said burner tube having an open end which is moveable up and down to open and close respectively a fluid passageway therethrough, a fingerpiece mounted to pivot in said fingerpiece cavity and connected at one end to said burner tube for moving said open end up and down as said fingerpiece is pivoted and a cover plate attached to said gas reservoir and covering the tops of said projections to maintain said sparking wheel, flint element, spring element and fingerpiece in operative relationship in their respective recesses, said fingerpiece element being resiliently biased toward a passageway closing position.

18. A pyrophoric lighter comprising a gas reservoir sealable to maintain gas fuel under high pressure in its liquefied state therein, a plurality of projections extending upwardly from a top wall of said reservoir and forming therebetween a plurality of recesses including a horizontally extending elongated flint recess which opens at one end to a sparking wheel recess, a burner recess in communication with the intersection of said sparking wheel and flint recesses and a fingerpiece recess extending between a point outside said projections and said burner recess, said projections further including a stub axle extending upwardly into said sparking wheel recess, a sparking wheel having a serrated surface and rotatably mounted on said stub axle, a flint element and a spring element extending within said flint recess, said flint element being urged by said spring element against the serrated surface of said sparking wheel, a burner tube extending outwardly from within said reservoir to a point in said burner cavity, said burner tube having an open end which is moveable up and down to open and close respectively a fluid passageway therethrough, a fingerpiece extending through and pivotal in said fingerpiece cavity, one end of said fingerpiece being connected to said burner tube and the other end having a finger engageable portion external to said projecting elements, said fingerpiece further having an upwardly extending resilient arm, a cover piece attached to said reservoir and covering said sparking wheel, flint element and spring element to maintain these elements in operative relationship, said cover piece further extending over said fingerpiece cavity and forcing downwardly upon said resilient arm of said fingerpiece to bias said fingerpiece toward a passageway closing position.

19. A pyrophoric gas lighter comprising a reservoir for containing highly volatile fuel under high pressure in its liquid form, burner valve means including a fluid passageway extending from a point within said reservoir to a moveable valve control element external thereto, said fluid passageway being closeable by movement of said valve control element relative to said reservoir, a sparking wheel having a serrated surface and mounted for rotation about a stub axle integral with said reservoir and which extends from the outer surface thereof in the vicinity of said burner valve assembly, a flint element located in a recess formed in the outer surface of said reservoir and guided thereby toward said sparking wheel, said flint element being biased against the serrated surface of said sparking wheel by resilient means within said recess, a cover piece attached to said reservoir and extending over said sparking wheel, flint element and resilient means to hold these items in cooperative positional relationship on said reservoir, a fingerpiece moveable between said cover piece and said reservoir in a direction generally toward said burner means, resilient means urging said fingerpiece in a direction away from said burner means, and interconnecting means adapted to convert inward movement of said fingerpiece to fluid passage opening movement of said valve control element.

20. A pyrophoric gas lighter comprising a reservoir for containing highly volatile fuel under high pressure in its liquid form, a burner valve means including an outer casing sealably engaged with and extending through one wall of said reservoir and containing a fluid passageway which extends into said outer casing to a burner opening outside said reservoir, said fluid passageway being openable and closeable by movement of a valve control element relative to said reservoir, the outer surface of said reservoir being formed with an elongated flint groove which opens into a sparking wheel cavity in the vicinity of said burner opening, a stub axle extending from said outer surface of said reservoir into said sparking wheel cavity in a direction substantially perpendicular to the longitudinal axis of said recess, a sparking wheel and a cam member rotatably mounted on said stub axle, a flint element located in said flint groove, a spring member operating in said groove to force said flint element against the peripheral surface of said sparking wheel, ratchet means interposed between sparking wheel and said cam member for effecting uni-directional rotational motion of the former by reciprocal rotational motion of the latter, a cover piece attached to said reservoir and extending over said sparking wheel, cam member and flint element to hold these elements in cooperative relationship to each other, a fingerpiece mounted for depressive inward movement relative to said reservoir and adapted to convert said depressive movement to rotational movement of said cam member, and means interconnecting said cam member and said burner valve assembly to cause opening of said valve when said cam member is rotated to a position coincident with a given amount of depression of said fingerpiece.

21. The lighter described in claim 20 wherein said cover piece is rotatably mounted on said reservoir for movement between a first position extending over said sparking wheel, cam member, and flint element to a second flint exposing position.

22. The lighter described in claim 21 wherein said spring member extends upwardly into a cam shaped recess in said cover piece, said cam shaped recess being defined by a surface on said cover piece which urges said spring member away from said sparking wheel upon rotation of said cover piece to a flint exposing position.

23. The lighter described in claim 20 wherein said fingerpiece is mounted on said reservoir to pivot about an axis perpendicular to said stub axle.

24. The lighter described in claim 23 wherein said fingerpiece pivotally engages the lower portion of said reservoir through a socket and axle connection and rotates inwardly toward one side of said reservoir, said fingerpiece being resiliently biased away from said reservoir and restrained at a maximum outward position by an abutment with said cover piece.

25. The lighter described in claim 23 wherein said fingerpiece engages said cam member via a slot and projection connection whereby inward movement of said fingerpiece produces partial rotation of said cam member in one direction and outward movement of said fingerpiece produces partial rotation of said cam member in the opposite direction.

26. The lighter described in claim 20 wherein said burner valve means includes a burner nozzle which is moveable up and down to open and close respectively said fluid passageway, and a lifting lever extending from a fixed point on said reservoir to a helical surface about the periphery of said cam member said lifting lever being connected to said burner nozzle whereby depression of said fingerpiece causes said cam member to rotate and raise said burner nozzle via said lifting lever.

References Cited by the Examiner

UNITED STATES PATENTS

| | | | |
|---|---|---|---|
| 1,657,352 | 1/1928 | Florman | 67—7.1 |
| 1,660,401 | 2/1928 | Strauss | 67—7.1 |
| 2,497,137 | 2/1950 | Rodanet | 67—7.1 |
| 2,746,277 | 5/1956 | Perlin | 67—7.1 |
| 2,750,774 | 6/1956 | Perlin | 67—7.1 |
| 2,779,180 | 1/1957 | Perlin | 67—7.1 |
| 2,780,085 | 2/1957 | Perlin | 67—7.1 |

EDWARD J. MICHAEL, *Primary Examiner.*

UNITED STATES PATENT OFFICE
CERTIFICATE OF CORRECTION

Patent No. 3,240,034 March 15, 1966

Conrad Zellweger et al.

It is hereby certified that error appears in the above numbered patent requiring correction and that the said Letters Patent should read as corrected below.

In the heading to the printed specification, line 10, for "2,890/62; Feb. 28, 1963, 8,179/63, 7,833/63; Mar. 1," read -- 28,920/62; Feb. 27, 1963, 7,833/63; Feb. 28, 1963, 8,179/63; Mar. 1, --.

Signed and sealed this 16th day of July 1968.

(SEAL)
Attest:

Edward M. Fletcher, Jr.
Attesting Officer

EDWARD J. BRENNER
Commissioner of Patents